(12) United States Patent
Ozios et al.

(10) Patent No.: US 6,829,812 B2
(45) Date of Patent: Dec. 14, 2004

(54) GRAB HANDLE ASSEMBLY SYSTEM AND METHOD

(75) Inventors: David A. Ozios, Holland, MI (US); Mathias R. Fox, Zeeland, MI (US); Thomas S. Hodgson, Holland, MI (US); Brian J. Sparks, Holland, MI (US); Ben E. Sapak, Holland, MI (US)

(73) Assignee: Johnson Controls Technology Company, Holland, MI (US)

( * ) Notice: Subject to any disclaimer, the term of this patent is extended or adjusted under 35 U.S.C. 154(b) by 0 days.

(21) Appl. No.: 10/246,310

(22) Filed: Sep. 18, 2002

(65) Prior Publication Data

US 2004/0051346 A1 Mar. 18, 2004

(51) Int. Cl.$^7$ .................................................. B23P 11/00
(52) U.S. Cl. ........................ 29/428; 29/897.2; 296/214; 16/444
(58) Field of Search ........................ 29/428, 437, 816, 29/897.2; 296/214, 71, 1.02; 16/444, 446, 436; 24/458, 461, 531

(56) References Cited

U.S. PATENT DOCUMENTS

| | | | |
|---|---|---|---|
| 4,794,668 A | * | 1/1989 | Lorence et al. ............. 16/110.1 |
| 4,893,866 A | | 1/1990 | Dowd et al. |
| 4,913,484 A | | 4/1990 | Dowd et al. |
| 4,981,323 A | | 1/1991 | Dowd et al. |
| 5,082,323 A | | 1/1992 | Dowd et al. |
| 5,105,521 A | | 4/1992 | Dowd et al. |
| 5,403,064 A | | 4/1995 | Mahler et al. |
| 5,519,917 A | | 5/1996 | Cordonnier |
| 5,577,301 A | | 11/1996 | De Maagd |
| 5,625,921 A | | 5/1997 | Smith |
| 5,632,061 A | | 5/1997 | Smith et al. |
| 5,662,375 A | * | 9/1997 | Adams et al. ............... 296/214 |
| 5,855,408 A | | 1/1999 | Rickabus |
| 5,931,525 A | | 8/1999 | Rickabus |
| 5,975,606 A | | 11/1999 | Forbes et al. |
| 6,106,055 A | | 8/2000 | Fischer |
| 6,231,109 B1 | | 5/2001 | Beaver |
| 6,324,732 B1 | | 12/2001 | Arisaka et al. |

FOREIGN PATENT DOCUMENTS

| | | |
|---|---|---|
| EP | 0722880 B1 | 7/1996 |
| EP | 1084908 A2 | 3/2001 |
| EP | 1179447 A2 | 2/2002 |
| FR | 2761422 A1 | 10/1998 |
| FR | 2764010 A1 | 12/1998 |

OTHER PUBLICATIONS

International Search Report; International Application No. PCT/US/03/28979; mailed Dec. 4, 2003.

* cited by examiner

*Primary Examiner*—David P. Bryant
*Assistant Examiner*—Stephen Kenny
(74) *Attorney, Agent, or Firm*—Foley & Lardner LLP

(57) ABSTRACT

A headliner system configured to mount to a vehicle roof structure comprises a retainer clip coupled to a substrate, and a handle movable between a first position and a second position. The handle is retained by a retaining system such as a biasing element captured between the roof structure and a projection. A method of mounting a handle to vehicle roof structure comprises providing a retaining system comprising a retainer clip, coupling the retainer clip to a headliner, coupling the handle to the retainer clip and orientating it in a first position, moving the handle to a second position to capture a portion of the handle between the retainer clip and a projection, locating the headliner relative to the roof structure, and moving the handle to a third position to retain a portion of the handle between at least a portion of the retaining system and the roof structure.

12 Claims, 4 Drawing Sheets

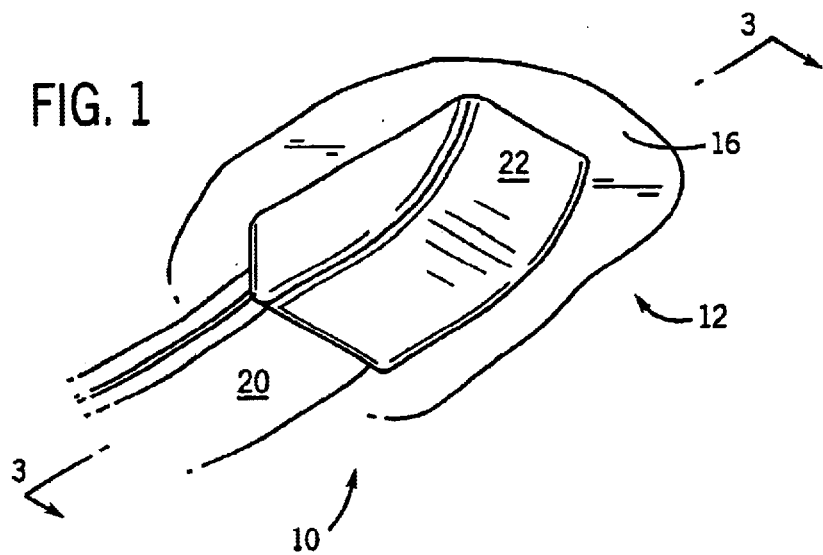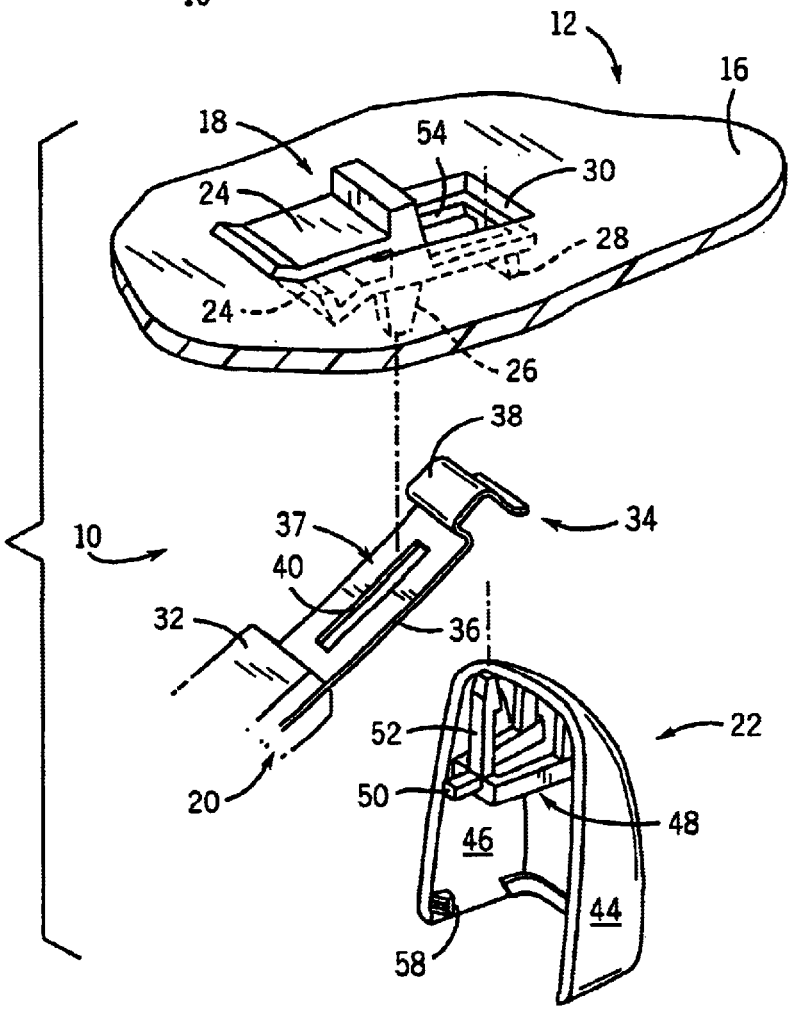

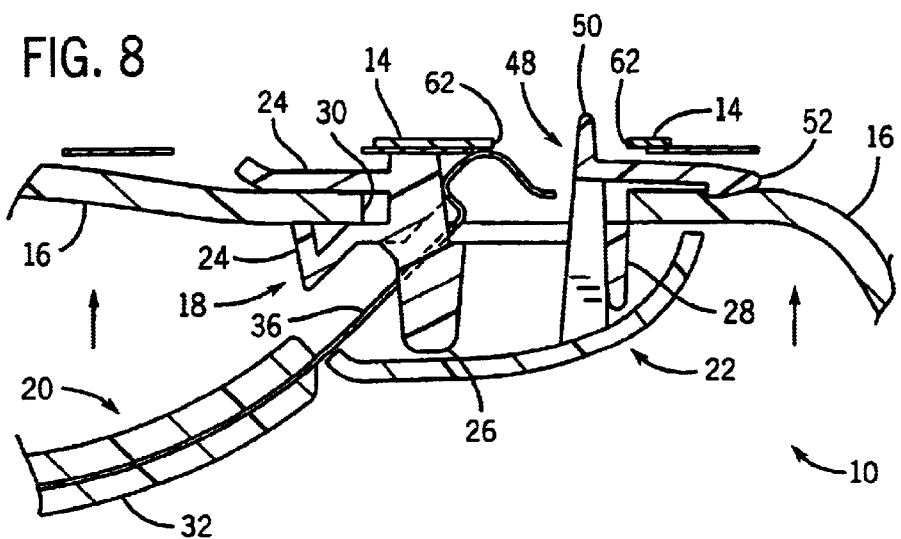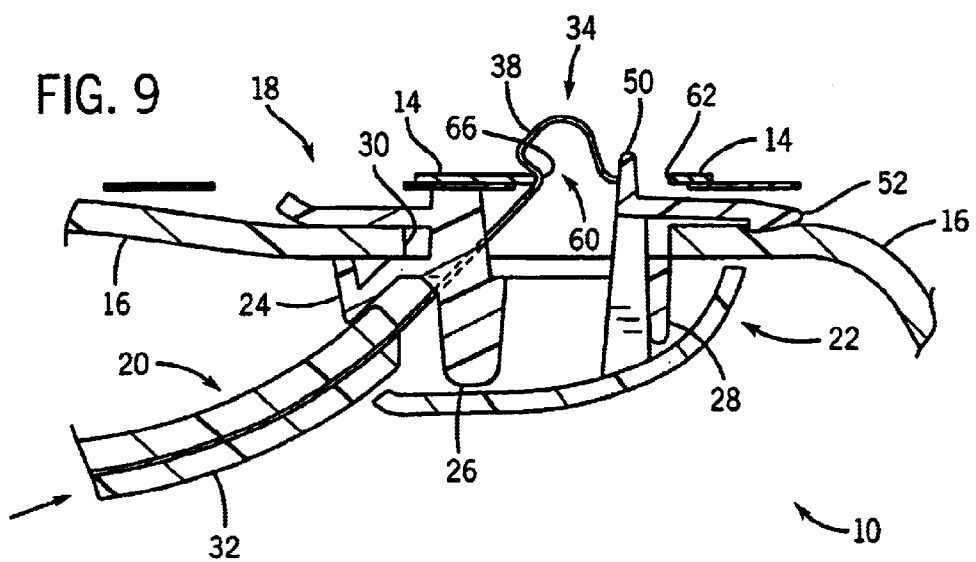

GRAB HANDLE ASSEMBLY SYSTEM AND METHOD

FIELD OF THE INVENTION

The present invention relates to a grab handle assembly.

BACKGROUND OF THE INVENTION

It is generally known to provide for "assist" or "grab" handles in a vehicle passenger compartment. Such grab handles are typically mounted in a vehicle such that they sit at an angle to the horizon and are used by occupants when entering or exiting the vehicle. Typically, the grab handle is mounted through a headliner to a roof bracket or rail. The grab handle may be a component of a headliner assembly or may be mounted after the headliner is installed in the passenger compartment.

When conventional grab handles are installed to the underside of the roof structure (particularly when they are shipped as part of the headliner assembly), the headliner system (and/or grab handles) are loaded straight upward in the vehicle's "Z" axis direction. As such, the handle mounting features tend to interfere with the roof rails before the assembly reaches its intended location so that a combination of bending, manipulating, and contorting the headliner and rocking the grab handles is needed to overcome the interference and engage the mounting features.

To provide an inexpensive, reliable, and widely adaptable grab handle assembly that avoids the above-referenced and other problems would represent a significant advance in the art.

SUMMARY OF THE INVENTION

A primary feature of the present invention is to provide an inexpensive, easy-to-manufacture, and easy-to-install grab handle assembly that overcomes the above-noted disadvantages.

Another feature of the present invention is to provide a grab handle assembly that can be quickly and easily installed or removed from a vehicle interior.

Another feature of the present invention is to provide a grab handle assembly shipped as part of an overhead system that is coupled (e.g., as a secondary stage) into the roof structure after the headliner system is in place.

Another feature of the present invention is to provide a grab handle assembly that can be mounted to the roof structure in a perpendicular direction to the mounting surface so that the headliner does not need to be manipulated or contorted to attain anchoring of the grab handles.

How these and other advantages and features of the present invention are accomplished (individually, collectively, or in various subcombinations) will be described in the following detailed description of the preferred and other exemplary embodiments, taken in conjunction with the FIGURES. Generally, however, they are accomplished in an apparatus for mounting a handle to a substrate. The apparatus comprises a retaining system comprising a retainer clip and a strap movable between a first position and a second position. A portion of the strap is deformable to retain the handle by an interference fit when the strap is in the second position.

These and other advantages and features of the present invention may also be accomplished in a headliner system configured to mount to a vehicle roof structure. The headliner system comprises a substrate, a handle movable between a first position and a second position. The handle comprises a biasing element, and a retainer clip coupled to the substrate. The handle is retained by the biasing element being captured between the roof structure and a projection.

These and other advantages and features of the present invention may also be accomplished in a method of mounting a handle to a substrate. The method comprises coupling a retainer clip to the substrate, coupling the handle to the retainer clip in a first position, and capturing a portion of the handle between the retainer clip and a projection by moving the handle from the first position to a second position.

These and other advantages and features of the present invention may also be accomplished in a method of mounting a handle to vehicle roof structure. The method comprises providing a retaining system comprising a retainer clip, coupling the retainer clip to a headliner, coupling the handle to the retainer clip and orientating it in a first position, moving the handle to a second position to capture a portion of the handle between the retainer clip and a projection, locating the headliner relative to the roof structure, and moving the handle to a third position to retain a portion of the handle between at least a portion of the retaining system and the roof structure. In a preferred embodiment of the invention, the handle is moved to the second position by pulling it away from the retaining system, and the handle is moved to the third position by pushing it towards the retaining system.

The present invention further relates to various features and combinations of features shown and described in the disclosed embodiments. Other ways in which the objects and features of the disclosed embodiments are accomplished will be described in the following specification or will become apparent to those skilled in the art after they have read this specification. Such other ways are deemed to fall within the scope of the disclosed embodiments if they fall within the scope of the claims which follow.

DESCRIPTION OF THE FIGURES

FIG. 1 is a perspective view of a grab handle assembly mounted in a vehicle interior according to a preferred embodiment.

FIG. 2 is an exploded perspective view of the grab handle assembly and headliner of FIG. 1.

FIG. 8 is a sectional view of the grab handle assembly positioned for coupling to a roof structure in the vehicle interior.

FIG. 9 is a sectional view of the handle located in an installed position.

DETAILED DESCRIPTION OF PREFERRED AND OTHER EXEMPLARY EMBODIMENTS

Figure 3:
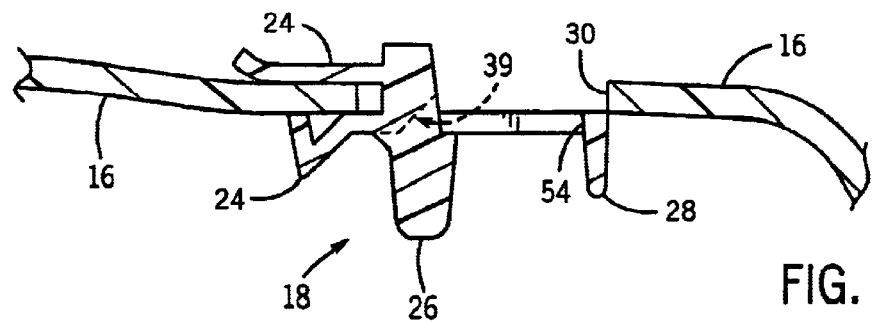
FIG. 3 is a sectional view of a retainer clip mounted to a headliner.

Before proceeding to the detailed description of the preferred and exemplary embodiments, several comments can be made about the general applicability and the scope thereof.

First, one particular headliner system is illustrated in the FIGURES, namely one having a single layer. The present invention may also be used with a layered headliner system which includes an interior fabric layer, an intermediate structural layer, and a convenience layer which abuts the vehicle roof. A large number of different headliner constructions are known in the art, and the present invention can be used with them as well. For example, the fabric and foam layers may be readily combined into a single layer as shown, or more layers of material can be employed, typically in higher end vehicles where a plush feel is desirable. The present invention has broad applicability to other types of headliners, other types of substrates, and the like.

In addition, while an attachment of an grab handle to a vehicle headliner is shown, the present invention has broad applicability for other vehicle interior accessories such as visors, other types of handles, a coat hook, etc. It is becoming increasingly important to motor vehicle manufacturers to provide a wide range of passenger accessible components, and overall structural and aesthetic design flexibility is enhanced when the headliner or roof area of a vehicle can be employed.

It should also be understood at the outset that the present invention has broad applicability for cars, SUV's, vans, light trucks, and other vehicles or other devices or environments where a grab handle system can be used to enhance vehicle ingress, egress, and the like. Furthermore, the attachment technique may be used in other (e.g., non-vehicle) applications.

With regard to the location of the grab handle itself, it can be located at any of a variety of locations in the headliner system or in a variety of areas of the vehicle, e.g., at the trunk, door, dashboard, seats, or "A", "B", "C" or "D" pillars of the vehicle, and the like.

The particular materials used to construct the exemplary embodiments are also illustrative. For example, injection molded high density polyethylene is the preferred method and material for making the clip, cap, and grip base, but other materials can be used, including other thermoplastic resins such as polypropylene, other polyethylenes, acrylonitrile butadiene styrene ("ABS"), polyurethane nylon, any of a variety of homopolymer plastics, copolymer plastics, plastics with special additives, filled plastics, etc. Also, other molding operations may be used to form these components, such as blow molding, rotational molding, etc. Components of the strap can also be manufactured from stamped alloy materials such as steel or aluminum.

Proceeding now to the description of the preferred embodiment, FIGS. 1 and 2 illustrates an "assist" or "grab" handle assembly 10 for mounting with an overhead system shown as a headliner system 12 to roof structure 14 (e.g., bracket, rail, etc.) of a vehicle.

As mentioned above, headliner system 12 could be configured and dimensioned to be used with any of a variety of vehicles such as cars, SUVs, vans, light trucks, or any vehicle which has a roof and a headliner system located between the roof and vehicle occupants. The illustrated headliner system 12 would typically include a substrate 16 having three conventional layers, namely an inner fabric layer, an intermediate structural foam layer, and a reinforcement or convenience layer. Each layer is formed for structural or aesthetic purposes, as is generally known in the vehicle headliner art. For example, the layers can be simultaneously or individually thermoformed (if materials which soften upon the application of heat are used), or they may be laid up, sprayed, molded or constructed using these or other known headliner fabrication methods. Also, although the layers may be separate from one another, they could be combined (in various subcombinations) or some of the layers might be eliminated in their entirety or other layers added. Further, the individual layers can be made from fabrics, foams, fibers, molded fiberboard, corrugated paper or plastics, etc. or combinations of the foregoing materials, again as is well known in the art.

Referring to FIG. 2, grab handle assembly 10 includes a retainer clip 18, a handle 20, and a cap 22.

Referring to FIGS. 2 and 3, clip 18 is configured to mount to substrate 16 and includes a receptacle (defined by a pair of spring members 24), and a pair of tabs (referred to herein a first tab 26 and a second tab 28). As shown by an arrow in FIG. 3, clip 18 is mounted to substrate 16 by partially inserting it into an opening 30, aligning the edge of substrate 16 with the receptacle, and sliding it so that spring members 24 engages substrate 16.

Opening 30 is formed in substrate 16 (e.g., in each of the layers) for mounting of grab handle assembly 10. Additionally, other openings may be formed in substrate 16 to accommodate other common vehicle accessories (e.g., a light or other overhead component (mirror, sun glasses holder, garage door opener, holder, etc.), inboard couplers for sun visors, a coat hook attachment. The accessories are, in and of themselves, very well known and need not be described here.

Figure 4:
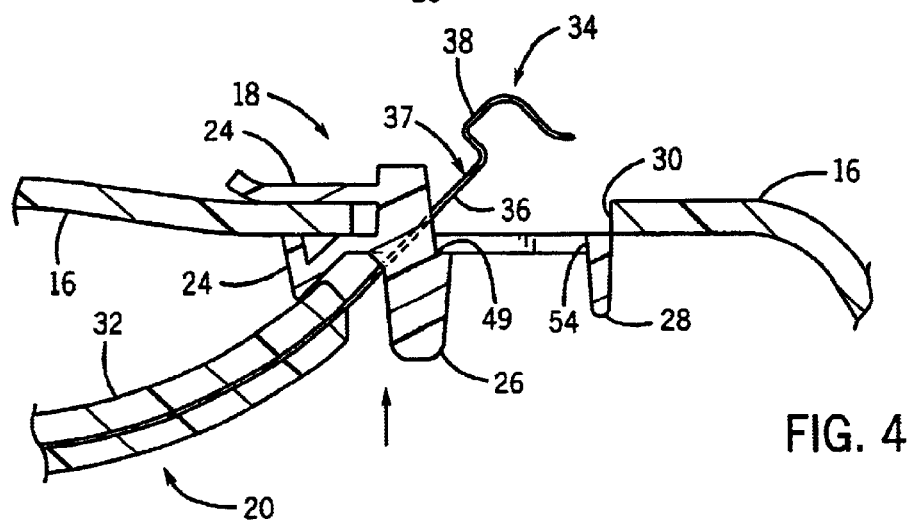
FIG. 4 is a sectional view of a handle engaged with the retainer clip of FIG. 3.

Referring to FIGS. 2 and 4, handle 20 is configured to provide a grip for the occupant as he or she enters or exits the vehicle. According to a preferred embodiment, handle 20 is formed with a steel stamping substrate with a plastic overmold. Handle 20 includes a grip 32 and a mounting interface shown as a spring clip 34. Spring clip 34 extends from grip 32 and includes a strap 36 and a biasing element shown as a bent portion 38 at a distal end of strap 36. Preferably, bent portion 38 is formed by a "U"-shaped steel that extends from grip 32. As shown by an arrow in FIG. 4, handle 20 is mounted to substrate 16 by engagement between first tab 26 on clip 18 and a slot 40 in strap 36. A first major surface 37 of strap 36 is located against an angled surface 39 on clip 18.

Figure 5:
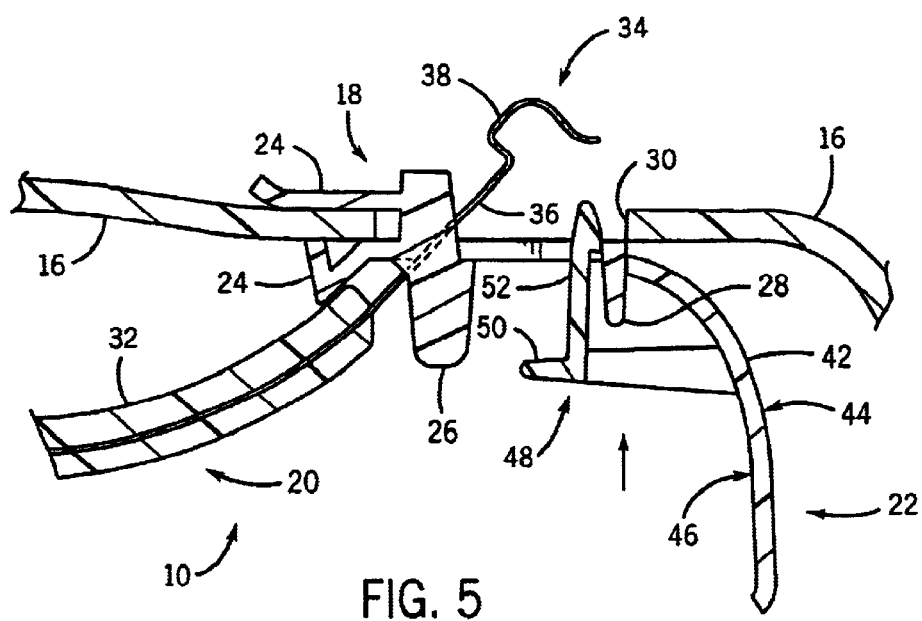
FIG. 5 is a sectional view of a cap engaging the retainer clip.

Referring to FIGS. 1, 2, and 5, cap 22 includes a base 42 having an outer surface 44 (which faces to the passenger compartment when installed) and an inner surface 46. A projection 48 extends from inner surface 46 and includes a tab 50 and a retaining member shown as a finger 52.

Figure 6:
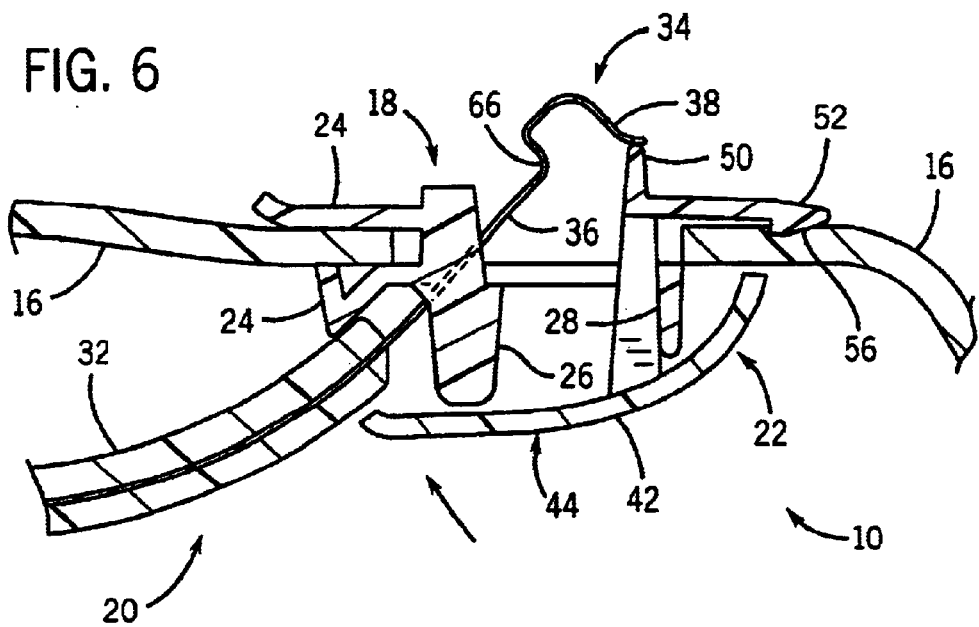
FIG. 6 is a sectional view of the cap of FIG. 5 rotated to a closed position.

As shown by an arrow in FIG. 5, cap 22 is coupled to the subassembly of clip 18 and substrate 16 by initially inserting finger 52 into an opening 54 in clip 18 so that second tab 28 extends between finger 52 and a distal end of base 42. As shown by an arrow in FIG. 6, cap 22 is then rotated around tab 50 (i.e., about an axis perpendicular with the longitudinal axis of handle 20) from a open position to a closed position. A barb 56 on finger 52 engages substrate 16 to aid in securing cap 22 in the closed position (e.g., the flexible fabric or foam layers). (Alternatively, barb 56 engages a detent in substrate 16.) Rotation of cap 22 causes tab 50 to flex strap 36. Also, the engagement of second tab 28 and projection 48 is configured to provide for a snap fit closure of cap 22. Preferably, projections 58 on inner surface 46 of base 42 engage handle 20 and/or clip 18 in a snap-fit engagement.

Figure 7:
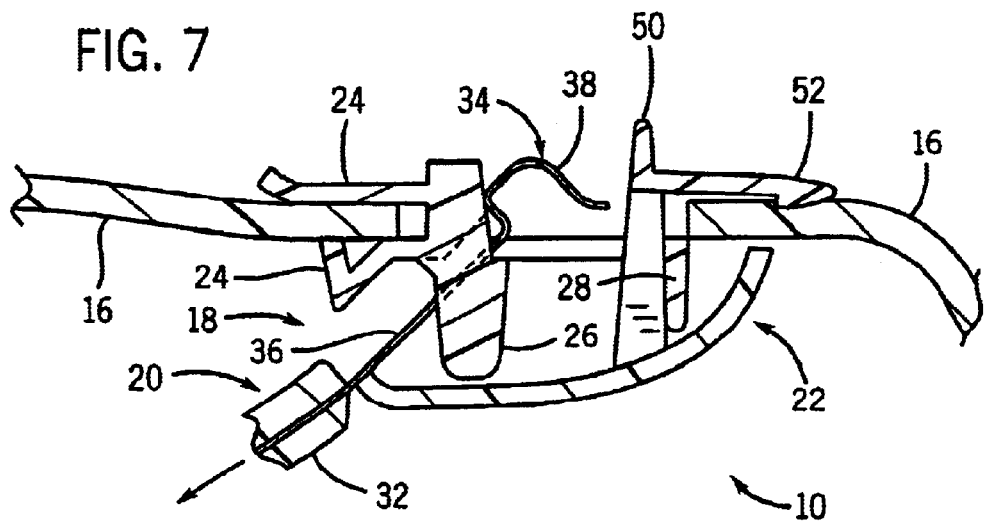
FIG. 7 is a sectional view of the handle moved to a pre-installation position.

Referring to FIG. 7, handle 20 is then moved from its initial position (e.g., pulled away from projection 48 the direction of the arrow) towards a captured position. In this captured position, bent portion 38 is snapped into place between cap 22 and clip 18 (e.g., to inhibit movement of handle assembly 10, prevent gaps from appearing between handle assembly 10 and substrate 16, etc.). As such, spring clip 34 of handle 20 is captured between projection 48 and first tab 26. Preferably, a notch 49 in first tab 26 assists in retaining strap 36 in the desired position.

As shown by arrows in FIG. 8, headliner system 12 is then lifted into place and to be installed to the underside of roof structure 14. Preferably, tab 50 on cap 22 and a rib on spring member 24 of clip 18 and bent portion 38 of handle 20 provide "locators." Locators are configured to assist in locating headliner system 12 relative to openings 60 in roof structure 14. Then, as shown by an arrow in FIG. 9, each handle 20 is moved from its captured position to an engaged or installed position (i.e., pushed back inside its respective cap 22 towards tab 50). Movement of handle 20 to the installed position causes bent portion 38 to protrude through opening 60 and lock into place (e.g., snap on pop) in roof structure 14. An edge 62 that defines opening 60 is captured in a crease 66 formed between bent portion 38 and the flat portion of strap 36. Bent portion 38 is therefore biased or compressed edge 62 and tab 50 of projection 48 of cap 22. According to a preferred embodiment, headliner system 12 is assembled and shipped as an integrated system that is mounted to the vehicle interior during a later stage (e.g., by the vehicle OEM manufacturer).

For service to headliner system 12 (or other portions of the vehicle obstructed by headliner system 12), roof structure 14, or handle 20, cap 22 is pulled free of its snaps and is rotated out of the way. Then, preferably with the aid of a tool (e.g., a screwdriver), strap 36 can be dislodged from the mounting opening 60 and clip 18 can be unhooked from headliner opening 30.

It is also important to note that the construction and arrangement of the elements of the grab handle assembly as shown in the preferred and other exemplary embodiments are illustrative only. Although only a few embodiments of the present invention have been described in detail in this disclosure, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited in the claims. For example, this handle assembly may have any of a variety of applications, including marine, automotive, aviation, and the like. Also, it is important to note that the term "clip," "grab handle," "and "substrate" are intended to be broad terms and not terms of limitation. Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and/or omissions may be made in the design, operating conditions and arrangement of the preferred and other exemplary embodiments without departing from the spirit of the present invention as expressed in the appended claims.

What is claimed is:

1. A method of mounting a handle to vehicle roof structure, the method comprising:

providing a retaining system comprising a retainer clip;

coupling the retainer clip to a headliner;

coupling the handle to the retainer clip and orientating it in a first position;

moving the handle to a second position to capture a portion of the handle between the retainer clip and a projection;

locating the headliner relative to the roof structure;

moving the handle to a third position to retain a portion of the handle between at least a portion of the retaining system and the roof structure.

2. The method of claim 1 wherein the step of moving the handle to the third position comprises deforming the portion of the retaining system and maintaining it in a biased condition.

3. The method of claim 2 wherein handle comprises a strap, the step of coupling the handle to the retainer clip includes engaging a tab on the retainer clip into a slot on the strap.

4. The method of claim 3 wherein the handle comprises a biasing element, the step of moving the handle to the third position comprises flexing the strap and biasing element so that biasing element snaps into the third position.

5. The method of claim 4 wherein the step of moving the handle to a second position comprises pulling the handle away from the retaining system, and the step of moving the handle to a third position comprises pushing the handle towards the retaining system.

6. The method of claim 2 further comprising the step of coupling a cap to the retaining clip and encapsulating at least a portion of the retaining system.

7. A method of mounting a handle to a headliner, the method comprising:

providing a retaining system comprising a retainer clip;

coupling the retainer clip to the headliner;

coupling the handle to the retainer clip and orientating it in a first position; and capturing a portion of the handle between the retainer clip and a projection by moving the handle to a second position by pulling the handle away from the retaining clip;

locating the headliner relative to the roof structure moving the handle to a third position to retain a portion of the handle between at least a portion of the retaining system and the roof structure.

8. The method of claim 7 wherein handle comprises a strap, the step of coupling the handle to the retainer clip includes engaging a tab on the retainer clip into a slot on the strap.

9. The method of claim 7 wherein the step of moving the handle to the third position comprises deforming the portion of the retaining system and maintaining it in a biased condition.

10. The method of claim 9 wherein the handle comprises a biasing element, the step of moving the handle to the third position comprises flexing the strap and biasing element so that biasing element snaps into the third position.

11. The method of claim 7 wherein the step of moving the handle to a third position comprises pushing the handle towards the retaining system.

12. The method of claim 11 further comprising the step of coupling a cap to the retaining clip and encapsulating at least a portion of the retaining system.

* * * * *